(12) United States Patent
Nakai et al.

(10) Patent No.: US 8,586,246 B2
(45) Date of Patent: Nov. 19, 2013

(54) POSITIVE ELECTRODE ACTIVE MATERIAL, POSITIVE ELECTRODE USING THE SAME AND NON-AQUEOUS ELECTROLYTE SECONDARY BATTERY

(75) Inventors: Hideki Nakai, Fukushima (JP); Toru Odani, Fukushima (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 12/551,982

(22) Filed: Sep. 1, 2009

(65) Prior Publication Data

US 2010/0055567 A1 Mar. 4, 2010

(30) Foreign Application Priority Data

Sep. 1, 2008 (JP) ................................. 2008-223880

(51) Int. Cl.
*H01M 4/131* (2010.01)
*H01M 4/505* (2010.01)
*H01M 4/525* (2010.01)

(52) U.S. Cl.
USPC .................. 429/231.95; 429/231.3; 429/223; 429/224; 429/212; 252/182.1

(58) Field of Classification Search
USPC ............................... 429/209–246; 252/182.1
See application file for complete search history.

(56) References Cited

U.S. PATENT DOCUMENTS

| | | | |
|---|---|---|---|
| 5,962,167 A | 10/1999 | Nakai et al. | |
| 6,372,385 B1 | 4/2002 | Kweon et al. | |
| 6,569,573 B1 | 5/2003 | Mikhaylik et al. | |
| 6,653,021 B2 | 11/2003 | Kweon et al. | |
| 6,984,469 B2 | 1/2006 | Kweon et al. | |
| 2002/0076113 A1 | 6/2002 | Kondo | |
| 2003/0148187 A1 | 8/2003 | Yamaguchi et al. | |
| 2005/0118508 A1* | 6/2005 | Yong et al. | 429/246 |
| 2007/0048609 A1* | 3/2007 | Ueda et al. | 429/218.1 |
| 2007/0190408 A1* | 8/2007 | Inoue et al. | 429/145 |
| 2007/0292764 A1* | 12/2007 | Soma et al. | 429/231.1 |
| 2008/0020283 A1* | 1/2008 | Miyashiro et al. | 429/322 |

FOREIGN PATENT DOCUMENTS

| | | |
|---|---|---|
| JP | 02030070 A * | 1/1990 |
| JP | HEI 07-235292 | 9/1995 |
| JP | 10-241681 | 9/1998 |
| JP | 11-204145 | 6/1999 |
| JP | 3048798 | 3/2000 |
| JP | 3054829 | 4/2000 |
| JP | 2000-149950 | 5/2000 |
| JP | 2000-156227 | 6/2000 |
| JP | 2000-164214 | 6/2000 |
| JP | 2000-195517 | 7/2000 |
| JP | 2000-215910 | 8/2000 |
| JP | 3111791 | 9/2000 |
| JP | 3172388 | 3/2001 |

(Continued)

*Primary Examiner* — Raymond Alejandro
*Assistant Examiner* — Helen McDermott
(74) *Attorney, Agent, or Firm* — K&L Gates LLP

(57) ABSTRACT

A positive electrode active material includes: a particle containing a positive electrode material capable of intercalating and deintercalating an electrode reactant; and a film provided in at least a part of the particle and having a peak of $C_2H_5S^+$, $C_3H_7S^+$ or $C_4H_9S^+$ obtained by cation analysis by time of flight secondary ion mass spectrometry.

13 Claims, 6 Drawing Sheets

(56) References Cited

FOREIGN PATENT DOCUMENTS

| | | |
|---|---|---|
| JP | 3192855 | 5/2001 |
| JP | 3212639 | 7/2001 |
| JP | 2001-256979 | 9/2001 |
| JP | 2002231227 | 8/2002 |
| JP | 3358478 | 10/2002 |
| JP | 2003-514356 | 4/2003 |
| JP | 3691279 | 6/2005 |
| JP | 3733404 | 10/2005 |
| JP | 2007-335331 | 12/2007 |
| JP | 2008-071569 | 3/2008 |
| JP | 4280436 | 3/2009 |

\* cited by examiner

POSITIVE ELECTRODE ACTIVE MATERIAL, POSITIVE ELECTRODE USING THE SAME AND NON-AQUEOUS ELECTROLYTE SECONDARY BATTERY

CROSS REFERENCES TO RELATED APPLICATIONS

The present application claims priority to Japanese Priority Patent Application JP 2008-223880 filed in the Japan Patent Office on Sep. 1, 2008, the entire contents of which is hereby incorporated by reference.

BACKGROUND

The present application relates to a positive electrode active material, a positive electrode using the same and a non-aqueous electrolyte secondary battery. In detail, the present application relates to a positive electrode active material capable of improving a cycle life of a battery, a positive electrode using the same and a non-aqueous electrolyte secondary battery.

In recent years, techniques of portable electronic appliances have been conspicuously developed, and electronic appliances such as mobile phones and laptop personal computers have started to be recognized as a fundamental technology for supporting the highly computerized society. Also, research and development regarding high functionalization of these electronic appliances are energetically advanced, and power consumption of these electronic appliances increases steadily in proportion thereto. On the other hand, these electronic appliances are required to be driven for a long period of time, and densification of high energy of a secondary battery which is a drive power source has been inevitably desired. Also, the prolongation of a cycle life has also been desired in view of environmental consideration.

From the viewpoints of occupied volume and mass of a battery to be built in an electronic appliance, it is desired that the energy density of the battery is as high as possible. At present, a lithium ion secondary battery is built in almost all of appliances because it has a high voltage and an excellent energy density as compared with other battery systems.

In general, the lithium ion secondary battery uses a lithium transition metal complex oxide such as lithium cobaltate (LiCoO2) and lithium nickelate (LiNiO2) for a positive electrode and a carbon material for a negative electrode, respectively and is used at an operating voltage in the range of from 4.2 V to 2.5 V. In a unit cell, the fact that a terminal voltage can be increased to 4.2 V largely relies upon excellent electrochemical stability of a non-aqueous electrolyte material, a separator and so on.

For the purposes of realizing higher performances and enlarging applications of such a lithium ion secondary battery, a number of investigations have been advanced. As one of them, for example, it is investigated to increase the energy density of a positive electrode active material starting with lithium cobaltate by a method for increasing a charge voltage or the like, thereby contriving to attain a high capacity of the lithium ion secondary battery.

However, in the case of repeating charge and discharge at a high capacity, there is involved a problem that deterioration of the capacity is caused, whereby the battery life becomes short.

Then, for example, Japanese Patent No. 3172388 discloses a method for enhancing battery characteristics such as a charge and discharge cycle characteristic by coating a metal oxide on the surface of a positive electrode. Also, Japanese Patent No. 3691279 discloses a method for increasing structural stability and thermal stability by coating a metal oxide on the surface of a positive electrode active material.

Also, in coating the surface of a positive electrode active material, effects for improving a cycle characteristic and enhancing thermal stability by a coating form thereof are also investigated. For example, JP-A-7-235292, JP-A-2000-149950, JP-A-2000-156227, JP-A-2000-164214, JP-A-2000-195517 and JP-A-2002-231227 disclose a method for uniformly coating a lithium transition metal complex oxide. Also, JP-A-2001-256979 discloses a positive electrode active material having a lump of a metal oxide deposited on a metal oxide layer.

SUMMARY

However, in the coating element, coating method and coating form disclosed in the foregoing Japanese Patents Nos. 3172388 and 3691279, the diffusion of a lithium ion is inhibited, and therefore, there is involved a defect that a sufficient capacity is not obtained at a charge and discharge current value in a practically useful region.

According to the methods disclosed in JP-A-7-235292, JP-A-2000-149950, JP-A-2000-156227, JP-A-2000-164214, JP-A-2000-195517 and JP-A-2002-231227, though the capacity can be kept high, it is still insufficient for enhancing the cycle characteristic at a high level. Also, as a result of preparing a positive electrode active material having a structure in which a lump of a metal oxide is deposited on a metal oxide layer by the method disclosed in JP-A-2001-256979, a sufficient charge and discharge efficiency was not obtained, and the capacity was largely lowered.

As described previously, by modifying the positive electrode active material, though the cycle characteristic or thermal stability can be improved to some extent, the battery capacity is easily lowered. Also, the degree of improvement of battery characteristics obtained by the foregoing methods is not sufficient. Also, a more improvement regarding suppression of the gas generation in the inside of a battery to be caused in a high-temperature environment is demanded.

Accordingly, it is desirable to provide a positive electrode active material having a high capacity and an excellent charge and discharge cycle characteristic, a positive electrode using the same and a non-aqueous electrolyte secondary battery.

According to a first embodiment, there is provided a positive electrode active material including a particle containing a positive electrode material capable of intercalating and deintercalating an electrode reactant; and a film provided in at least a part of the particle and having a peak of $C_2H_5S+$, $C_3H_7S+$ or $C_4H_9S+$ obtained by cation analysis by time of flight secondary ion mass spectrometry.

According to a second embodiment, there is provided a positive electrode including
 a conductive substrate; and
 a positive electrode active material layer provided on the conductive substrate and containing at least a positive electrode active material,
 wherein the positive electrode active material includes
 a particle containing a positive electrode material capable of intercalating and deintercalating an electrode reactant; and
 a film provided in at least a part of the particle and having a peak of C2H5S+, C3H7S+ or C4H9S+ obtained by cation analysis by time of flight secondary ion mass spectrometry.

According to a third embodiment, there is provided a non-aqueous electrolyte secondary battery including a positive electrode having a positive electrode active material, a negative electrode, a separator and an electrolyte, wherein the positive electrode active material includes a particle containing a positive electrode material capable of intercalating and deintercalating an electrode reactant; and a film provided in at least a part of the particle and having a peak of $C_2H_5S+$, $C_3H_7S+$ or $C_4H_9S+$ obtained by cation analysis by time of flight secondary ion mass spectrometry.

According to an embodiments, since a film which is characterized in that a peak of $C_2H_5S^+$, $C_3H_7S^+$ or $C_4H_9S^+$ obtained by cation analysis by time of flight secondary ion mass spectrometry exists is formed in at least a part of a particle containing a positive electrode material capable of intercalating and deintercalating an electrode reactant, chemical stability of a positive electrode active material can be enhanced. In the case where a positive electrode having this positive electrode active material is used together with an electrolytic solution in an electrochemical device such as batteries, not only an electrode reactant efficiently permeates therethrough, but decomposition of the electrolytic solution is suppressed. Accordingly, in a battery using the positive electrode active material according to the embodiment, high charge voltage properties and accompanying high energy density properties can be realized; and a good charge and discharge cycle characteristic can be revealed even at a high charge voltage.

Additional features and advantages are described herein, and will be apparent from the following Detailed Description and the figures.

DETAILED DESCRIPTION

Figure 1:
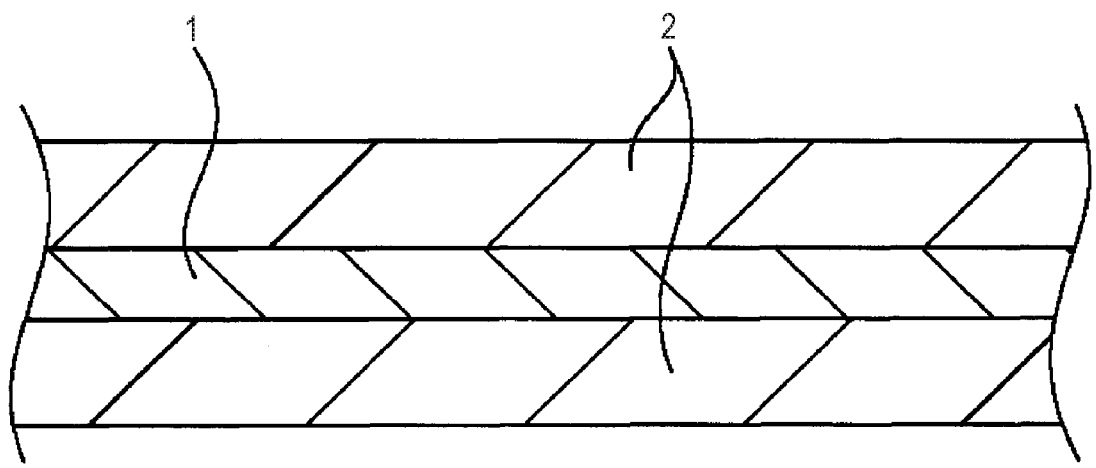
FIG. 1 is an enlarged sectional view showing a configuration of a positive electrode according to an embodiment.

The present application is described in greater detail with reference to the accompanying drawings.

(1) Configuration of Positive Electrode Active Material

A positive electrode active material according to an embodiment is provided with a film in at least a part of a particle containing a positive electrode material capable of intercalating and deintercalating an electrode reactant.

The positive electrode material capable of intercalating and deintercalating an electrode reactant is preferably a compound capable of intercalating and deintercalating lithium. Specifically, lithium-containing compounds, for example, lithium oxide, lithium phosphorus oxide, lithium sulfide, lithium-containing intercalation compounds, etc. are suitable as the positive electrode material. These compounds may be used in admixture of two or more kinds thereof. In order to increase the energy density, lithium-containing transition metal oxides containing at least lithium (Li) and one or plural transition metal elements are preferable. Of these, lithium-containing compounds having a layered structure, for example, lithium cobaltate, lithium nickelate, a lithium-nickel-cobalt-manganese complex oxide, etc. are more preferable from the standpoint of realizing a high capacity. Lithium cobaltate-containing transition metal oxides composed mainly of lithium cobaltate are especially preferable because they have high filling properties and a high discharge voltage. The lithium cobaltate-containing transition metal oxide may be one substituted with at least one element selected among elements belonging to the Groups 2 to 15 or one having been subjected to a fluorination treatment.

Examples of such a lithium-containing compound include lithium complex oxides having an average composition represented by the following formula (I), and more specifically the following formula (II) and lithium complex oxides having an average composition represented by the following formula (III).

$$Li_pNi_{(1-q-r)}Mn_qM1_rO_{(2-y)}X_z \quad (I)$$

In the formula (I), M1 represents at least one member selected among elements belonging to the Groups 2 to 15 exclusive of nickel (Ni) and manganese (Mn); X represents at least one member selected among elements belonging to the Group 16 and elements belonging to the Group 17 other than oxygen (O); and p, q, r, y and z are values falling within the ranges of $0 \leq p \leq 1.5$, $0 \leq q \leq 1.0$, $0 \leq r \leq 1.0$, $-0.10 \leq y \leq 0.20$ and $0 \leq z \leq 0.2$, respectively. The composition of lithium varies depending upon the state of charge and discharge; and the value of p represents a value in a completely discharged state.

$$Li_aCo_{(1-b)}M2_bO_{(2-c)} \quad (II)$$

In the formula (II), M2 represents at least one member selected from the group consisting of vanadium (V), copper (Cu), zirconium (Zr), zinc (Zn), magnesium (Mg), aluminum (Al), gallium (Ga), yttrium (Y) and iron (Fe); and a, b and c are values falling within the ranges of $0.9 \leq a \leq 1.1$, $0 \leq b \leq 0.3$ and $-0.1 \leq c \leq 0.1$, respectively. The composition of lithium varies depending upon the state of charge and discharge; and the value of a represents a value in a completely discharged state.

$$Li_wNi_xCo_yMn_zM3_{(1-x-y-z)}O_{(2-v)} \quad (III)$$

In the formula (III), M3 represents at least one member selected from the group consisting of vanadium (V), copper (Cu), zirconium (Zr), zinc (Zn), magnesium (Mg), aluminum (Al), gallium (Ga), yttrium (Y) and iron (Fe); and v, w, x, y and z are values falling within the ranges of $-0.1 \leq v \leq 0.1$, $0.9 \leq w \leq 1.1$, $0 < x < 1$, $0 < y < 1$, $0 < z < 0.5$ and $0 \leq (1-x-y-z)$, respectively. The composition of lithium varies depending upon the state of charge and discharge; and the value of w represents a value in a completely discharged state.

Furthermore, for example, a lithium complex oxide having a spinel type structure, which is represented by the following formula (IV), and more specifically $LidMn2O4$ ($d \approx 1$) and the like can be exemplified as the lithium-containing compound.

$$Li_pMn_{(2-q)}M4_qO_rF_s \quad (IV)$$

In the formula (IV), M4 represents at least one member selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and p, q, r and s are values falling within the ranges of $0.9 \leq p \leq 1.1$, $0 \leq q \leq 0.6$, $3.7 \leq r \leq 4.1$ and $0 \leq s \leq 0.1$, respectively. The composition of lithium varies depending upon the state of charge and discharge; and the value of p represents a value in a completely discharged state.

Furthermore, for example, a lithium complex phosphate having an olivine type structure, which is presented by the following formula (V), and more specifically the following formula (VI) can be exemplified as the lithium-containing compound. Further specifically, $Li_eFePO_4$ ($e≅1$) and the like can be exemplified.

$$Li_aM5_bPO_4 \qquad (V)$$

In the formula (V), M5 represents at least one member selected among elements belonging to the Groups 2 to 15; and a and b are values falling within the ranges of $0 \leq a \leq 2.0$ and $0.5 \leq b \leq 2.0$, respectively.

$$Li_tM6PO_4 \qquad (VI)$$

In the formula (VI), M6 represents at least one member selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); and t is a value falling within the range of $0.9 \leq t \leq 1.1$. The composition of lithium varies depending upon the state of charge and discharge; and the value of t represents a value in a completely discharged state.

As such a particle, one which is usually available as a positive electrode active material can be used as a starting raw material. However, as the case may be, a particle obtained after lump breaking of a secondary particle using a ball mill, a triturator, etc. can be used.

Also, by carrying out a coating treatment with an element different from a principal transition metal constituting the lithium complex oside, a lithium complex oxide particle, on the surface of which the element different from the principal transition metal exists, may be used. This is because higher electrochemical stability can be obtained. It is preferable that at least one of nickel (Ni), manganese (Mn) and phosphorus (P) is contained as the element different from this principal transition metal. The principal transition metal constituting this particle as referred to herein means a transition metal in the highest existing ratio among transition metals constituting the complex oxide particle. For example, in the case where lithium cobaltate having an average composition of $LiCu_{0.98}Al_{0.01}Mg_{0.01}O_2$ is used as the lithium complex oxide, the principal transition metal is cobalt, and it is preferable that the lithium complex oxide is subjected to a coating treatment with nickel, manganese, phosphorus, etc.

Examples of the positive electrode material capable of intercalating and deintercalating an electrode reactant include, in addition to the foregoing compounds, oxides such as titanium oxide, vanadium oxide and manganese dioxide; disulfides such as iron disulfide, titanium disulfide and molybdenum disulfide; chalcogenides such as niobium selenide; sulfur; and conductive polymers such as sulfur, polyaniline and polythiophene.

The film which is provided in at least a part of the foregoing particle may be formed so as to cover entirely or partially the surface of the particle containing the positive electrode material capable of intercalating and deintercalating an electrode reactant. This film has a peak of $C_2H_5S^+$, $C_3H_7S^+$ or $C_4H_9S^+$ obtained by cation analysis by time of flight secondary ion mass spectrometry.

Such a film contributes to an enhancement of the chemical stability of the positive electrode active material. When a positive electrode using the positive electrode active material having such a film provided thereon is used together with an electrolytic solution in an electrochemical device such as batteries, not only an electrode reactant efficiently permeates therethrough, but decomposition of the electrolytic solution is suppressed, and therefore, realization of a high capacity of the battery can be expected. Also, in view of the fact that decomposition of the electrolytic solution is suppressed, an enhancement of the cycle characteristic can be expected. The film may contain, in addition to the film having a peak of $C_2H_5S^+$, $C_3H_7S^+$ or $C_4H_9S^+$ obtained by cation analysis by time of flight secondary ion mass spectrometry, a decomposition product thereof.

The film having a peak of $C_2H_5S^+$, $C_3H_7S^+$ or $C_4H_9S^+$ obtained by cation analysis by time of flight secondary ion mass spectrometry can be formed by using a polymer compound represented by the following formula (1).

In the formula (1), R1 and R2 each represents a hydrogen group or a hydrocarbon group, provided that R1 and R2 may be bonded to each other to form a cyclic structure; and a1 and b1 each represents an integer of 1 or more.

In the formula (1), R1 and R2 are each preferably a hydrogen group or an alkyl group having from 1 to 6 carbon atoms, more preferably a hydrogen group or an alkyl group having from 1 to 4 carbon atoms, and especially preferably a hydrogen group or a methyl group.

In the formula (1), a1 is an integer of 1 or more, preferably an integer of from 2 to 5, and especially preferably an integer of from 2 to 4; and b1 is an integer of 1 or more, and preferably an integer of from 1 to 30.

Specific examples of the polymer compound represented by the formula (1) will be given below.

Compound 1-1

Polyethylene sulfide = poly(thiirane)

Compound 1-2

Polypropylene sulfide = poly(methylthiirane)

Compound 1-3

Poly(trimethylene sulfide) = poly(thiethane)

Compound 1-4

Poly(isobutylene sulfide) = poly(dimethylthiirane)

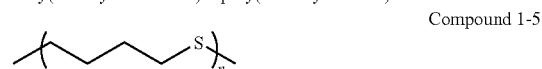

Compound 1-5

Poly(tetrahydrothiophene)

In the film, the foregoing compounds may be used singly or may be used as an arbitrary mixture of the plurality thereof.

Such a film can be confirmed by analyzing the surface of the positive electrode active material by, for example, TOF-SIMS (time of flight secondary ion mass spectrometry).

An average particle size of the positive electrode active material preferably falls within the range of 2.0 μm or more and not more than 50 μm. This is because when the average particle size of the positive electrode active material is less than 2.0 μm, in preparing a positive electrode, the positive electrode active material is easily separated from a positive electrode collector in a press step, and the surface area of the positive electrode active material is large, and therefore, the addition amount of a conductive agent, a binder or the like is inevitably increased, resulting in a lowering of the energy density per unit mass; whereas when it exceeds 50 μm, a possibility that the positive electrode active material penetrates through a separator, thereby causing a short circuit is high.

(2) Configuration of Positive Electrode

Next, a use example of the foregoing positive electrode active material is described with reference to FIG. 1. FIG. 1 shows a sectional structure of a positive electrode according to an embodiment. This positive electrode is, for example, used in an electrochemical device such as batteries and has a positive electrode collector 1 having a pair of opposing surfaces to each other and a positive electrode active material layer 2 provided on this positive electrode collector 1.

It is preferable that the positive electrode collector 1 is constituted of a material having good chemical stability, electrical conductivity and mechanical strength. Examples of such a material include metal materials such as aluminum, nickel and stainless steel.

The positive electrode active material layer 2 contains, for example, any one kind or two or more kinds of the foregoing positive electrode active material and is constituted so as to contain a conductive agent and a binder as the need arises. This positive electrode active material layer 2 may be provided on the both surfaces of the positive electrode collector 1 or may be provided on one surface thereof.

Examples of the conductive agent include carbon materials such as graphite, carbon black, acetylene black and ketjen black. These carbon materials may be used singly or in admixture of plural kinds thereof. The conductive agent may be a metal material or a conductive polymer so far as it is a material having conductivity.

Examples of the binder include synthetic rubbers such as styrene-butadiene based rubbers, fluorine based rubbers and ethylene-propylene-diene based rubbers; and polymer materials such as polyvinylidene fluoride. These binders may be used singly or in admixture of plural kinds thereof.

Since this positive electrode has a positive electrode active material in which a film which is characterized in that a peak of $C_2H_5S^+$, $C_3H_7S^+$ or $C_4H_9S^+$ obtained by cation analysis by time of flight secondary ion mass spectrometry exists is formed on the surface thereof, in the case where this positive electrode is used in an electrochemical device such as batteries, it is possible to contrive to realize a high capacity and to enhance a charge and discharge cycle characteristic.

(3) Manufacturing Method of Positive Electrode Active Material and Positive Electrode The positive electrode active material and the positive electrode according to the embodiments are, for example, manufactured by the following procedures. First of all, for example, a particle containing a positive electrode material capable of intercalating and deintercalating an electrode reactant, which is usually available as a positive electrode active material, is prepared as a starting raw material, and the surface of the particle is subjected to a coating treatment as the need arises.

The coating treatment is, for example, carried out by pulverizing and mixing a lithium-containing complex oxide particle as a positive electrode material and a compound containing an element different from the principal transition metal constituting this lithium-containing complex oxide, thereby cladding the element different from the principal transition metal constituting the lithium-containing complex oxide on the surface of the lithium-containing complex oxide particle. Cladding can be carried out by using, for example, a ball mill, a jet mill, a triturator, a pulverizer, etc. In that case, it is also effective to carry out cladding by adding a slight amount of a liquid component which can be exemplified by water. Also, cladding can be carried out by a mechanochemical treatment such as mechanofusion or a vapor deposition process such as a sputtering process and a chemical vapor deposition (CVD) process. Furthermore, cladding can be carried out by a wet process such as a process for mixing raw materials in water or a solvent such as ethanol, a neutralization titration process and a sol-gel process using a metal alkoxide as a raw material.

Also, a lithium-containing complex oxide particle having an element different from the principal transition metal cladded thereon may be baked at a temperature of, for example, 300° C. or higher and not higher than 1,000° C. in an oxidative atmosphere such as air and pure oxygen. Also, after baking, the particle size may be regulated by means of light pulverization, classification, etc. as the need arises. Furthermore, different coating layers may be formed by carrying out the coating treatment two times or more.

Then, a compound layer which is characterized in that a peak of $C_2H_5S+$, $C_3H_7S+$ or $C_4H_9S+$ obtained by cation analysis by time of flight secondary ion mass spectrometry exists is formed in at least a part of the surface of the particle of the starting raw material or a particle having the foregoing coating layer formed on the starting raw material, thereby preparing the positive electrode active material according the embodiment. In this specification, the layer of the positive electrode active material surface prior to assembling a battery is properly referred to as "coating layer", and the layer of the positive electrode active material surface after assembling a battery is properly referred to as "film", respectively. Examples of a method for forming a metal salt layer on the foregoing particle include liquid phase processes such as a coating process, a dipping process and a dip coating process; and vapor phase processes such as a vapor deposition process, a sputtering process and a CVD process. As the technique for forming a compound layer, these processes may be adopted singly or in combinations of two or more kinds thereof. Of these, a process for forming a compound layer using a solution containing the compound represented by the formula (1) is preferable as the liquid phase process. Specifically, for example, a particle containing the positive electrode material capable of intercalating and deintercalating an electrode reactant is mixed in the solution containing the foregoing compound, the mixture is stirred, and the solvent is then removed.

An amount of the compound represented by the formula (1), which is added in the solvent by a liquid phase process, is, for example, preferably more than 0.1% by weight and less than 5% by weight, and more preferably 0.2% by weight or more and not more than 3.0% by weight relative to the particle of the starting raw material or the particle having the foregoing coating layer provided on the starting raw material. When the addition amount of the compound represented by the formula (1) is less than the foregoing range, it is difficult to obtain enhancements in the discharge capacity and the charge and discharge cycle characteristic. On the other hand, when the addition amount of the compound represented by the formula (1) is more than the foregoing range, not only it is difficult to attain a high energy density of the positive electrode active material, but effects for enhancing the discharge capacity and the charge and discharge cycle characteristic are small.

Next, a positive electrode is prepared by using the thus prepared positive electrode active material. A preparation method of the positive electrode is not restricted. For example, a method in which known binder and conductive agent and so on are added to the positive electrode active material, a solvent is added, and the solution is then coated on the positive electrode collector 1; a method in which known binder and conductive agent and so on are added to the positive electrode active material, and the mixture is heated and then coated on the positive electrode collector 1; a method in which the positive electrode active material alone or a mixture thereof with a conductive agent and additionally a binder is subjected to molding or other treatment, thereby preparing a molded electrode on the positive electrode collector 1; and so on can be adopted. However, the preparation method of the positive electrode is not limited to these methods. More specifically, for example, a positive electrode can be obtained by mixing a positive electrode active material, a conductive agent and a binder to prepare a positive electrode mixture, dispersing this positive electrode mixture in a solvent such as 1-methyl-2-pyrrolidone to prepare a positive electrode mixture slurry, coating this positive electrode mixture slurry on the positive electrode collector 1, drying the solvent and then subjecting the resulting positive electrode collector 1 to compression molding by a roll press, etc. to form the positive electrode active material layer 2. Alternatively, it is also possible to prepare a positive electrode with strength by pressure molding while applying heat to the positive electrode active material regardless of the presence or absence of a binder.

As to other manufacturing method of the positive electrode active material and the positive electrode, first of all, a particle containing the positive electrode material capable of intercalating and deintercalating an electrode reactant is prepared as a starting raw material, and a positive electrode is prepared by using this positive electrode material and optionally, a binder and a conductive agent. Subsequently, by cladding the compound represented by the foregoing formula (1) on the surface of the positive electrode active material layer 2, the compound is cladded in at least a part of the surface of the positive electrode active material.

As a method for cladding the compound on the surface of the positive electrode active material layer 2, similar to the foregoing method for cladding the compound on the positive electrode active material surface, there can be exemplified liquid phase processes such as a coating process, a dipping process and a dip coating process; and vapor phase processes such as a vapor deposition process, a sputtering process and a CVD process. As the technique for forming a compound layer, these processes may be adopted singly or in combinations of two or more kinds thereof. Of these, a process for forming a compound layer using a solution containing the compound represented by the formula (1) is preferable as the liquid phase process. Specifically, for example, in the dipping process, the positive electrode collector 1 having the positive electrode active material layer 2 formed thereon is dipped in a solution containing the foregoing compound. The compound penetrates into the inside of the positive electrode material layer 2, whereby it exists among the particle containing the positive electrode material, the binder and the conductive agent and is also cladded on the surface of the particle. There is thus formed a compound layer containing the compound on the particle surface.

Next, the non-aqueous electrolyte secondary battery using the positive electrode active material and the positive electrode according to the embodiment is described.

Figure 2:
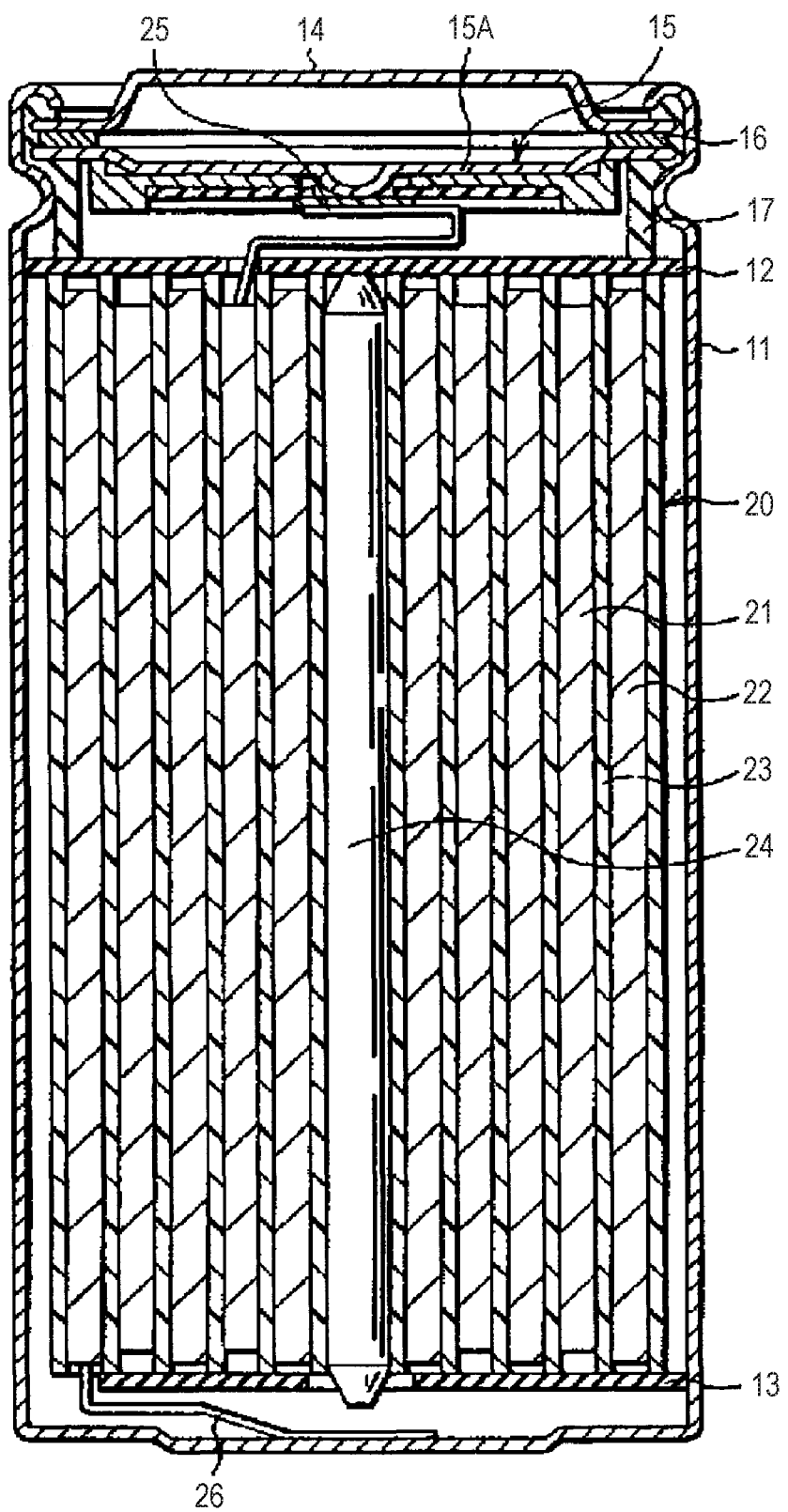
FIG. 2 is a sectional view showing a configuration of a battery according to Embodiment 1 according to the present application.

(4) Embodiment 1 of Non-Aqueous Electrolyte Secondary Battery (4-1) Configuration of Non-Aqueous Electrolyte Secondary Battery:

FIG. 2 shows a sectional structure of Embodiment 1 of a non-aqueous electrolyte secondary battery. This battery is, for example, a non-aqueous electrolyte secondary battery and is a so-called lithium ion secondary battery using lithium (Li) as an electrode reactant, in which the capacity of a negative electrode is expressed by a capacity component due to intercalation and deintercalation of lithium (Li).

This battery is of a so-called cylinder type and has a wound electrode body 20 in which a pair of a strip-shaped positive electrode 21 and a strip-shaped negative electrode 22 is wound via a separator 23 in the inside of a substantially hollow columnar battery can 11. The battery can 11 is made of, for example, nickel (Ni)-plated iron (Fe), and one end thereof is closed, with the other end being opened. A pair of insulating plates 12 and 13 is disposed in the inside of the battery can 11 vertically against the wound peripheral surface so as to interpose the wound electrode body 20 therebetween.

In the open end of the battery can 11, a battery lid 14 is installed by caulking with a safety valve mechanism 15 and a positive temperature coefficient element (PTC element) 16 provided in the inside of this battery lid 14 via a gasket 17, and the inside of the battery can 11 is hermetically sealed.

The battery lid 14 is made of, for example, the same material as in the battery can 11. The safety valve mechanism 15 is electrically connected to the battery lid 14 via the positive temperature coefficient element 16, and in the case where the pressure in the inside of the battery reaches a fixed value or more due to an internal short circuit or heating from the outside or the like, a disc plate 15A is reversed, whereby electrical connection between the battery lid 14 and the wound electrode body 20 is disconnected. When the temperature rises, the positive temperature coefficient element 16 controls a current due to an increase of a resistance value, whereby abnormal heat generation to be caused due to a large current is prevented from occurring. The gasket 17 is made of, for example, an insulating material, and asphalt is coated on the surface thereof.

For example, a center pin 24 is inserted in the center of the wound electrode body 20. A positive electrode lead 25 made of aluminum (Al), etc. is connected to the positive electrode 21 of the wound electrode body 20; and a negative electrode lead 26 made of nickel (Ni), etc. is connected to the negative electrode 22. The positive electrode lead 25 is welded to the safety valve mechanism 15, whereby it is electrically connected to the battery lid 14; and the negative electrode lead 26 is welded to the battery can 11, whereby it is electrically connected thereto.

[Positive Electrode]

Figure 3:
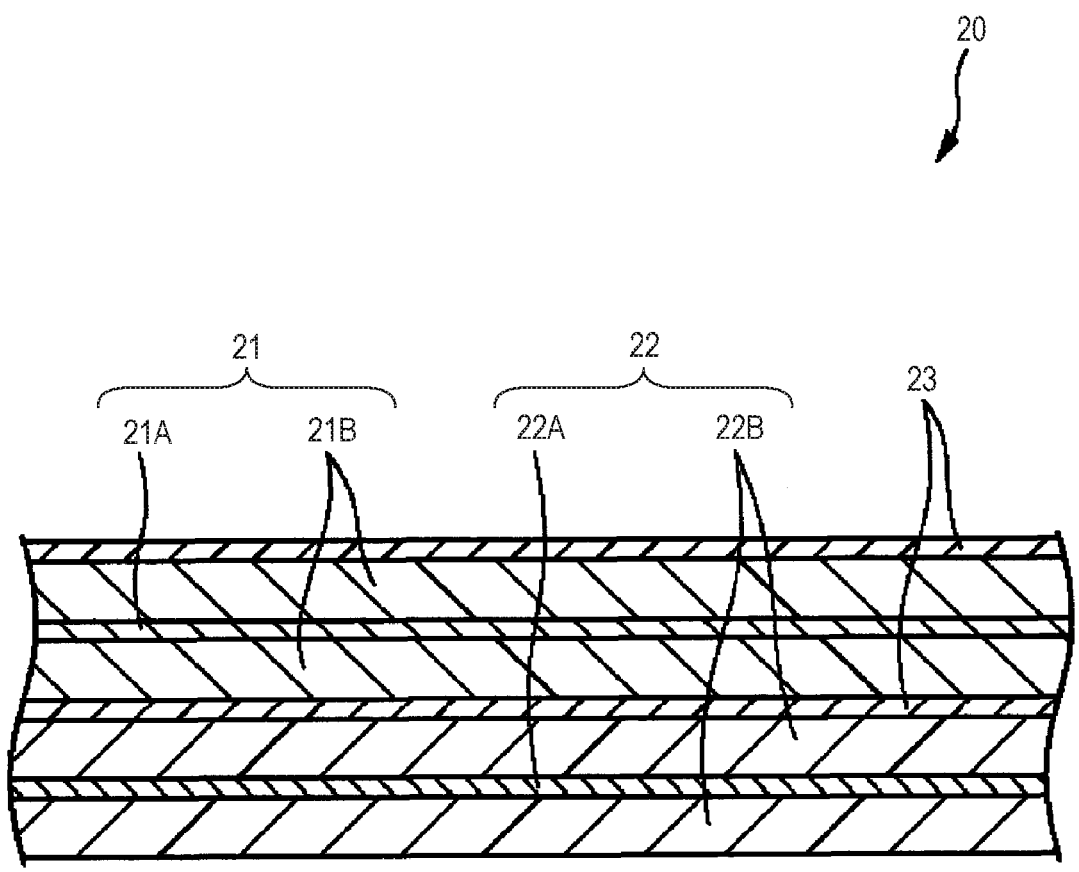
FIG. 3 is a sectional view showing enlargedly a part of a wound electrode body in the battery shown in FIG. 2.

FIG. 3 is a sectional view showing enlargedly a part of the wound electrode body 20 shown in FIG. 2. The positive electrode 21 has, for example, the same configuration as in the positive electrode shown in FIG. 1 and is provided with a positive electrode active material layer 21B on the both surfaces of a strip-shaped positive electrode collector 21A. Though illustration is omitted, a region where the positive electrode active material layer 21B exists on only one surface of the positive electrode collector 21A may be provided. The configurations of the positive electrode collector 21A and the positive electrode active material layer 21B are the same as those of the foregoing electrode collector 1 and the positive electrode active material layer 2, respectively.

[Negative Electrode]

As shown in FIG. 3, the negative electrode 22 has, for example, a negative electrode collector 22A having a pair of opposing surfaces to each other and a negative electrode active material layer 22B provided on the both surfaces or one surface of the negative electrode collector 22A. A region where the negative electrode active material layer 22B exists on only one surface of the negative electrode collector 22A may be provided. The negative electrode collector 22A is made of a metal foil, for example, a copper (Cu) foil, etc.

The negative electrode active material layer 22B contains, for example, a negative electrode active material and may contain other material which does not contribute to the charge, for example, a conductive agent, a binder, a viscosity modifier, etc. as the need arises. Examples of the conductive agent include graphite fibers, metal fibers and metal powders. Examples of the binder include fluorine based polymer compounds such as polyvinylidene fluoride; and synthetic rubbers such as styrene-butadiene rubbers and ethylene-propylene-diene rubbers. Examples of the viscosity modifier include carboxymethyl cellulose.

The negative electrode active material is constituted so as to contain any one kind or two or more kinds of negative electrode materials capable of electrochemically intercalating and deintercalating lithium (Li) at a potential of not more than 2.0 V against the lithium metal.

Examples of the negative electrode material capable of intercalating and deintercalating lithium (Li) include carbonaceous materials, metal compounds, oxides, sulfides, lithium nitrides such as $LiN_3$, a lithium metal, metals capable of forming an alloy together with lithium and polymer materials.

Examples of the carbonaceous material include hardly graphitized carbon, easily graphitized carbon, artificial graphite, natural graphite, pyrolytic carbons, cokes, graphites, vitreous carbons, organic polymer compound baked materials, carbon blacks, carbon fibers and active carbon. Of these, examples of the cokes include pitch coke, needle coke and petroleum coke. The organic polymer compound baked material as referred to herein refers to a material obtained through carbonization by baking a polymer material such as phenol resins and furan resins at an appropriate temperature, and a part thereof is classified into hardly graphitized carbon or easily graphitized carbon. Also, examples of the polymer material include polyacetylene and polypyrrole.

Of these negative electrode materials capable of intercalating and deintercalating lithium (Li), those having a charge and discharge potential relatively close to a lithium metal are preferable. This is because the lower the charge and discharge potential of the negative electrode 22, the easier the attainment of a high energy density of the battery. Above all, the carbon material is preferable because a change in the crystal structure to be generated at the time of charge and discharge is very small, a high charge and discharge capacity can be obtained, and a good cycle characteristic can be obtained. In particular, graphite is preferable because its electrochemical equivalent is large, and a high energy density can be obtained. Also, hardly graphitized carbon is preferable because an excellent cycle characteristic can be obtained.

Examples of the negative electrode material capable of intercalating and deintercalating lithium (Li) include a single body, an alloy or a compound of a metal element or a semi-metal element capable of forming an alloy together with lithium (Li). These materials are preferable because a high energy density can be obtained. In particular, the joint use of such a material with the carbon material is more preferable because not only a high energy density can be obtained, but an excellent cycle characteristic can be obtained. In this specification, the alloy includes alloys containing one or more kinds of metal elements and one or more kinds of semi-metal elements in addition to alloys composed of two or more kinds of metal elements. Examples of its texture include a solid solution, a eutectic (eutectic mixture), an intermetallic compound and one in which two or more kinds thereof coexist.

Examples of such a metal element or semi-metal element include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of such an alloy or compound include those represented by a chemical formula of $Ma_sMb_tLi_u$ or a chemical formula of $Ma_pMc_qMd_r$. In these chemical formulae, Ma represents at least one member of metal elements and semi-metal elements capable of forming an alloy together with lithium; Mb represents at least one member of metal elements and semi-metal elements other than lithium and Ma; Mc represents at least one member of non-metal elements; and Md represents at least one member of metal elements and semi-metal elements other than Ma. Also, the values of s, t, u, p, q and r are values satisfied with the relationships of $s>0$, $t \geq 0$, $u \geq 0$, $p>0$, $q>0$ and $r \geq 0$, respectively.

Above all, a single body, an alloy or a compound of a metal element or a semi-metal element belonging to the Group 4B of the short form of the periodic table is preferable; and silicon (Si) or tin (Sn) or an alloy or a compound thereof is especially preferable. These materials may be crystalline or amorphous.

Furthermore, examples of the negative electrode material capable of intercalating and deintercalating lithium include oxides, sulfides and other metal compounds inclusive of lithium nitrides such as $LiN_3$. Examples of the oxide include $MnO_2$, $V_2O_5$, and $V_6O_{13}$. Besides, examples of oxides having a relatively base potential and capable of intercalating and deintercalating lithium include iron oxide, ruthenium oxide, molybdenum oxide, tungsten oxide, titanium oxide and tin oxide. Examples of sulfides include NiS and MoS.

In the non-aqueous electrolyte secondary battery according to this Embodiment 1, by regulating the amount between the positive electrode active material and the negative electrode active material capable of intercalating and deintercalating lithium, a charge capacity by the negative electrode active material is larger than a charge capacity by the positive electrode active material, whereby the lithium metal does not deposit on the negative electrode 22 even at the time of complete charge.

Also, in this non-aqueous electrolyte secondary battery, an electrochemical equivalent of the negative electrode material capable of intercalating and deintercalating lithium is larger than an electrochemical equivalent of the positive electrode 21, whereby the lithium metal does not deposit on the negative electrode 22 on the way of charge.

[Separator]

The separator 23 partitions the positive electrode 21 and the negative electrode 22 from each other and allows a lithium ion to pass therethrough while preventing a short circuit of the current to be caused due to the contact of the both electrodes from occurring.

The separator 23 is, for example, constituted of a porous film made of a synthetic resin such as polytetrafluoroethylene (PTFE), polypropylene (PP) and polyethylene (PE), or a porous film made of a ceramic and may have a laminated structure of two or more kinds of these porous films. Of these, a polyolefin-made porous film is preferable because it is excellent in the effect for preventing a short circuit from occurring and is able to contrive to enhance the stability of a battery due to a shutdown effect. In particular, polyethylene is able to obtain a shutdown effect within the range of 100° C. or higher and not higher than 160° C. A resin obtained by copolymerizing polyethylene or polypropylene or blending them may also be used so far as it is provided with electrochemical stability. Also, a separator prepared by forming a porous resin layer such as polyvinylidene fluoride (PVdF) and polytetrafluoroethylene (PTFE) on a polyolefin-made porous film may be used.

An electrolytic solution which is a liquid electrolyte is impregnated in this separator 23.

[Electrolyte]

For example, a non-aqueous electrolytic solution having an electrolyte salt dissolved in a non-aqueous solvent can be used as the electrolyte. Electrolytes which have been used in existing non-aqueous electrolyte secondary batteries can be utilized.

Examples of the non-aqueous solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolan, 4-methyl-1,3-dioxolan, diethyl ether, sulfolane, methylsulfolane, acetonitrile, propionitrile, anisole, acetic acid esters, butyric acid esters and propionic acid esters. These solvents may be used singly or as an arbitrary mixture of two or more kinds thereof. Of these, for example, it is preferable that the non-aqueous solvent contains at least one member selected from cyclic carbonic acid esters such as propylene carbonate and ethylene carbonate and chain carbonic acid esters such as diethyl carbonate and dimethyl carbonate. This is because the cyclic characteristic can be enhanced. In that case, in particular, it is preferable that the non-aqueous solvent contains a mixture of a high-viscosity (high-dielectric constant) solvent such as propylene carbonate and ethylene carbonate and a low-viscosity solvent such as diethyl carbonate and dimethyl carbonate. This is because dissociation properties of the electrolyte salt and mobility of an ion are enhanced, and therefore, a higher effect is obtained.

The electrolyte salt includes one which is dissolved or dispersed in the foregoing non-aqueous solvent to generate an ion, and examples thereof include lithium salts.

Examples of the lithium salt include lithium perchlorate ($LiClO_4$), lithium hexaarsenate ($LiAsF_6$), lithium hexafluorophosphate ($LiPF_6$), lithium tetrafluoroborate ($LiBF_4$), $LiB(C_6H_5)_4$, $CH_3SO_3Li$, $CF_3SO_3Li$, $LiCl$ and $LiBr$. These compounds can be used singly or in combinations of two or more kinds thereof. Of these, lithium hexafluorophosphate ($LiPF_6$) is preferable because not only high ionic conductivity can be obtained, but the cycle characteristic can be enhanced.

A content of such an electrolyte salt is preferably in the range of from 0.1 moles to 3.0 moles, and more preferably in the range of from 0.5 moles to 2.0 moles per liter (L) of the solvent. This is because higher ionic conductivity can be obtained within this range.

In the non-aqueous electrolyte secondary battery according to this Embodiment 1, when charge is carried out, for example, a lithium ion is deintercalated from the positive electrode active material layer 21B and intercalated into the negative electrode active material layer 22B via the electrolytic solution. Also, when discharge is carried out, for example, a lithium ion is deintercalated from the negative electrode active material layer 22B and intercalated into the positive electrode active material layer 21B via the electrolytic solution.

An upper limit charge voltage of this non-aqueous electrolyte secondary battery may be, for example, 4.20 V. However, this non-aqueous electrolyte secondary battery is preferably designed such that the upper limit charge voltage is higher than 4.20 V and falls within the range of 4.25 V or more and not more than 4.80 V and is more preferably designed such that the upper limit charge voltage falls within the range of 4.35 V or more and not more than 4.65 V. Also, a lower limit discharge voltage is preferably 2.00 V or more and not more than 3.30 V. For example, in the case where the battery voltage is 4.25 V or more, as compared with a battery with 4.2 V, even when the same positive electrode active material is concerned, the amount of lithium to be deintercalated per unit mass increases. Therefore, in response thereto, the amount between the positive electrode active material and the negative electrode active material is regulated, and a high energy density is obtained. Also, according to the embodiment, since the film containing the metal salt represented by the foregoing formula (1) is formed in the positive electrode active material, even when the battery voltage is increased, not only an excellent cycle characteristic is obtained, but the gas generation in the inside of the battery can be suppressed.

(4-2) Manufacturing Method of Non-Aqueous Electrolyte Secondary Battery:

Next, one example of a method for manufacturing a non-aqueous electrolyte secondary battery according to Embodiment 1 is described.

First of all, the positive electrode 21 is obtained by the same method as the foregoing manufacturing method of a positive electrode active material and a positive electrode according to the embodiment.

The negative electrode 22 can be prepared by, for example, a method in which known binder and conductive agent and so on are added to the negative electrode active material, a solvent is added, and the solution is then coated on the negative electrode collector 22A; a method in which known binder and conductive agent and so on are added to the negative electrode active material, and the mixture is heated and then coated on the negative electrode collector 22A; or a method in which the negative electrode active material alone or a mixture thereof with a conductive agent and additionally a binder is subjected to molding or other treatment, thereby preparing a molded electrode on the negative electrode collector 22A. However, the preparation method of the negative electrode 22 is not limited to these methods. More specifically, for example, the negative electrode 22 is obtained by mixing a negative electrode active material and a binder to prepare a negative electrode mixture, dispersing this negative electrode mixture in a solvent such as 1-methyl-2-pyrrolidone to prepare a negative electrode mixture slurry, coating this negative electrode mixture slurry on the negative electrode collector 22A, drying the solvent and then subjecting the resulting negative electrode collector 22A to compression molding by a roll press, etc. to form the negative electrode active material layer 22B. Alternatively, it is also possible to prepare a negative electrode with strength by pressure molding while applying heat to the negative electrode active material regardless of the presence or absence of a binder.

Subsequently, the positive electrode lead 25 is installed in the positive electrode collector 21A by means of welding, etc.; and the negative electrode lead 26 is also installed in the negative electrode collector 22A by means of welding, etc. Thereafter, the positive electrode 21 and the negative electrode 22 are wound via the separator 23; a tip of the positive electrode lead 25 is welded to the safety valve mechanism 15; a tip of the negative electrode lead 26 is also welded to the battery can 11; and the wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, an electrolyte is injected into the inside of the battery can 11 and impregnated in the separator 23. Thereafter, the battery lid 14, the safety valve mechanism 15 and the temperature coefficient element 16 are fixed to the open end of the battery can 11 via the gasket 17 by caulking. There is thus prepared the secondary battery shown in FIG. 2.

Figure 4:
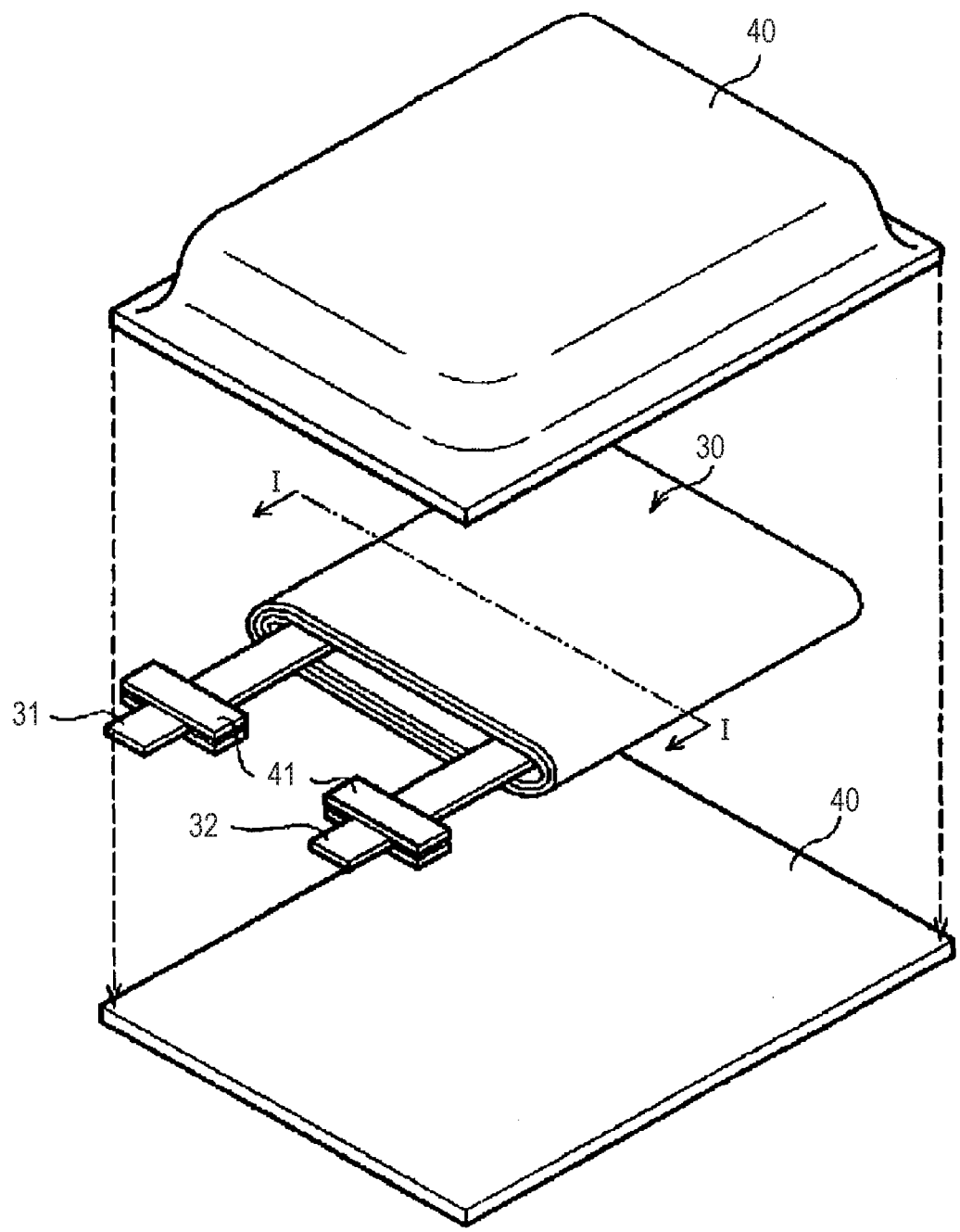
FIG. 4 is a sectional view showing a configuration of a battery according to Embodiment 2 according to the present application.

(5) Embodiment 2 of Non-Aqueous Electrolyte Secondary Battery (5-1) Configuration of Non-Aqueous Electrolyte Secondary Battery:

FIG. 4 shows a configuration of a non-aqueous electrolyte secondary battery according to Embodiment 2. This non-aqueous electrolyte secondary battery is one which is called a so-called laminated film type and in which a wound electrode body 30 having a positive electrode lead 31 and a negative electrode lead 32 installed therein is housed in the inside of an exterior member 40 in a film form.

The positive electrode lead 31 and the negative electrode lead 32 are each led out in, for example, the same direction from the inside toward the outside of the exterior member 40. The positive electrode lead 31 and the negative electrode lead 32 are each made of a metal material, for example, aluminum, copper, nickel, stainless steel, etc. and formed in a thin plate state or network state.

[Exterior Member]

The exterior member 40 is made of, for example, a rectangular aluminum laminated film obtained by sticking a nylon film, an aluminum foil and a polyethylene film in this order. For example, the exterior member 40 is disposed such that the polyethylene film side and the wound electrode body 30 are opposed to each other, and the respective outer edges are brought into intimate contact with each other by means of fusion or with an adhesive. A contact film 41 is inserted between the exterior member 40 and each of the positive electrode lead 31 and the negative electrode lead 32 for the purpose of preventing invasion of the outside air from occurring. The contact film 41 is made of a material having adhesive properties to the positive electrode lead 31 and the negative electrode lead 32, for example, polyolefin resins such as polyethylene, polypropylene, modified polyethylene and modified polypropylene.

The exterior member 40 may be made of a laminated film having other structure, a polymer film such as polypropylene or a metal film in place of the foregoing aluminum laminated film.

[Wound Electrode Body]

Figure 5:
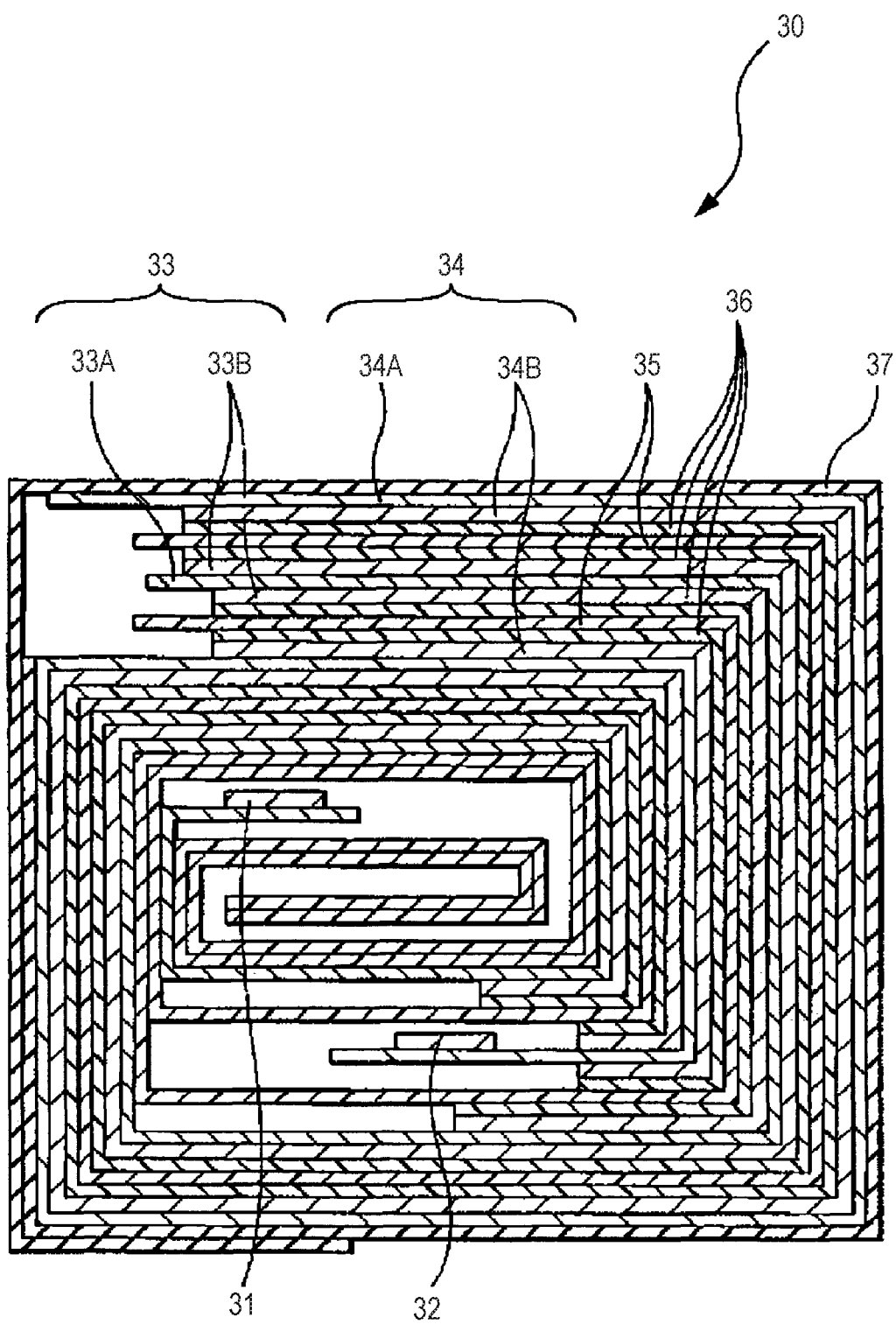
FIG. 5 is a sectional view along an I-I line of a wound electrode body shown in FIG. 4.
Figure 6:
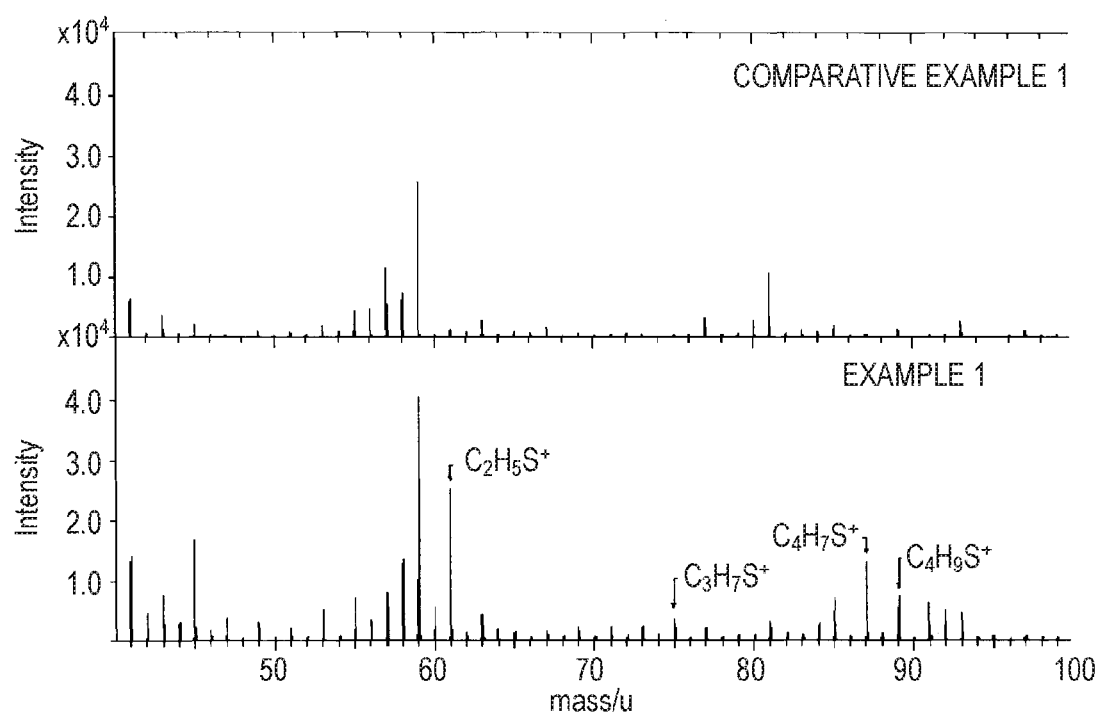
FIG. 6 is a diagram showing the results of surface analysis (positive secondary ion) of secondary batteries of Example 1 and Comparative Example 1 by TOF-SIMS (time of flight secondary ion mass spectrometry).

FIG. 5 shows a sectional structure along an I-I line of the wound electrode body 30 shown in FIG. 4. The wound electrode body 30 is one prepared by laminating a positive electrode 33 and a negative electrode 34 via a separator 35 and an electrolyte layer 36 and winding the laminate, and an outermost peripheral part thereof is protected by a protective tape 37.

The positive electrode 33 has a structure in which a positive electrode active material layer 33B is provided on one or both of the surfaces of a positive electrode collector 33A. The negative electrode 34 has a structure in which a negative electrode active material layer 34B is provided on one or both of the surfaces of a negative electrode collector 34A. The negative electrode active material layer 34B and the positive electrode active material layer 33B are disposed opposing to each other. The configurations of the positive electrode collector 33A, the positive electrode active material layer 33B, the negative electrode collector 34A, the negative electrode active material layer 34B and the separator 35 are the same as those of the positive electrode collector 21A, the positive electrode active material layer 21B, the negative electrode collector 22A, the negative electrode active material layer 22B and the separator 23, respectively in the foregoing Embodiment 1.

The electrolyte layer 36 contains an electrolytic solution and a polymer compound which will serve as a holding body for holding this electrolytic solution therein and forms a so-called gel. The electrolyte in a gel form is preferable because not only high ionic conductivity can be obtained, but liquid leakage of the battery can be prevented from occurring. The configuration of the electrolytic solution (namely, a solvent, an electrolyte salt and the like) is the same as in the secondary battery according to Embodiment 1.

Various polymers capable of absorbing the foregoing electrolytic solution to form a gel can be utilized as the polymer material. Specific examples of the polymer material which can be used include fluorine based polymers, for example, poly(vinylidene fluoride), poly(vinylidene fluoride-co-hexafluoropropylene), etc.; ether based polymers, for example, poly(ethylene oxide) and crosslinked materials of the same, etc.; and poly(acrylonitrile). In particular for oxidation-reduction stability, it is desirable to use a fluorine based polymer, for example, polymers of vinylidene fluoride.

The action and effect of the non-aqueous electrolyte secondary battery according to Embodiment 2 are the same as those of the non-aqueous electrolyte secondary battery in the foregoing Embodiment 1. Also, according to Embodiment 2, since the gas generation in the inside of the battery is suppressed, expansion and deformation of the non-aqueous electrolyte secondary battery can be suppressed.

(5-2) Manufacturing Method of Non-Aqueous Electrolyte Secondary Battery:

The non-aqueous electrolyte secondary battery according to this Embodiment 2 can be, for example, manufactured by the following three kinds of manufacturing methods.

In a first manufacturing method, first of all, a precursor solution containing an electrolytic solution, a polymer compound and a mixed solvent is coated on each of the positive electrode 33 and the negative electrode 34, and the mixed solvent is vaporized to form the electrolyte layer 36. Thereafter, the positive electrode lead 31 is installed in an end of the positive electrode collector 33A by means of welding, and the negative electrode lead 32 is also installed in an end of the negative electrode collector 34A by means of welding. Subsequently, the positive electrode 33 and the negative electrode 34 each having the electrolyte layer 36 formed thereon are laminated via the separator 35 to form a laminate. This laminate is wound in the longitudinal direction thereof, and the protective tape 37 is allowed to adhere to the outermost peripheral part of the wound laminate to form the wound electrode body 30. Finally, for example, the wound electrode body 30 is interposed within the exterior member 40, and the outer edges of the exterior member 40 are brought into intimate contact with each other by means of heat fusion, etc. and sealed. On that occasion, the contact film 41 is inserted between each of the positive electrode lead 31 and the negative electrode lead 32 and the exterior member 40. According to this, the non-aqueous electrolyte secondary battery shown in FIGS. 4 and 5 is completed.

In a second manufacturing method, first of all, as described previously, the positive electrode 33 and the negative electrode 34 are prepared; the positive electrode lead 31 and the negative electrode lead 32 are installed in the positive electrode 33 and the negative electrode 34, respectively; the positive electrode 33 and the negative electrode 34 are then laminated via the separator 35 and wound; and the protective tape 37 is allowed to adhere to the outermost peripheral part of the wound laminate, thereby forming a wound body serving as a precursor of the wound electrode body 30. Subsequently, this wound body is interposed within the exterior member 40, and the outer edges exclusive of one side are heat fused to form a bag, which is then housed in the inside of the exterior member 40. Subsequently, a composition for electrolyte containing an electrolytic solution, a monomer as a raw material of the polymer compound, a polymerization initiator and optionally, other materials such as a polymerization inhibitor is prepared and injected into the inside of the exterior member 40.

After injecting the composition for electrolyte, an opening of the exterior member 40 is heat fused in a vacuum atmosphere and hermetically sealed. Subsequently, the monomer is polymerized upon application of heat to form a polymer compound, thereby forming the electrolyte layer 36 in a gel form. There is thus obtained the secondary battery shown in FIGS. 4 and 5.

In a third manufacturing method, a wound body is formed in the same manner as in the foregoing first manufacturing method, except for using the separator 35 having a polymer compound coated on the both surfaces thereof, and then housed in the inside of the exterior member 40 in a bag form. Examples of the polymer compound which is coated on this separator 35 include polymers composed of, as a component, vinylidene fluoride, namely a homopolymer, a copolymer or a multi-component copolymer. Specific examples thereof include polyvinylidene fluoride; a two-component based copolymer composed of, as components, vinylidene fluoride and hexafluoropropylene; and a three-component based copolymer composed of, as components, vinylidene fluoride, hexafluoropropylene and chlorotrifluoroethylene. The polymer compound may contain one or two or more kinds of other polymer compounds together with the foregoing polymer composed of, as a component, vinylidene fluoride.

Subsequently, an electrolytic solution or the like is prepared and injected into the inside of the exterior member 40, and an opening of the exterior member 40 is then hermetically sealed by means of heat fusion, etc. Finally, the separator 35 is brought into intimate contact with the positive electrode 33 and the negative electrode 34 via the polymer compound upon heating while adding a weight to the exterior member 40. According to this, the electrolytic solution is impregnated in the polymer compound, and the polymer compound is gelled to form the electrolyte 36. There is thus completed the secondary battery.

In this third manufacturing method, an expansion characteristic is improved as compared with the second manufacturing method. Also, in the third manufacturing method, the monomer as a raw material of the polymer compound, the solvent and the like do not substantially remain in the electrolyte 36 as compared with the second manufacturing method, and the forming step of a polymer compound is controlled well. Accordingly, sufficient adhesive properties between each of the positive electrode 33 and the negative electrode 34 and each of the separator 35 and the electrolyte 36 is obtained.

Though the improvement behavior of battery characteristics of the non-aqueous electrolyte secondary battery according to these Embodiments 1 and 2 has not been elucidated yet, it may be estimated to be caused due to the following mechanism.

In a battery charged at 4.20 V or more, since the positive electrode active material generates a high electromotive force, an electrolyte coming into contact with the positive electrode active material lies in a strong oxidation environment. According to this, it may be considered that the metal components elute from the positive electrode active material which has become instable in view of the fact that a larger amount of lithium (Li) is extracted, whereby the positive electrode active material is deteriorated, or oxidative degradation of the electrolyte is caused. Also, it may be considered that the eluted metal components are reduced and deposited on the negative electrode side, whereby the surface of the negative electrode is covered, or intercalation and deintercalation of lithium are disturbed, resulting in deterioration of the charge and discharge cycle characteristic. Also, it may be considered that in view of the fact that the electrolyte causes oxidative degradation on the positive electrode to generate a gas or form a film on the positive electrode, the battery expands, or impedance increases.

On the other hand, in the positive electrode active material according to the embodiment, the film represented by the foregoing formula (1) is formed on the particle surface. It may be considered that this film is stable against a high electromotive force of the positive electrode and that it is able to inhibit a reaction between the positive electrode and the electrolytic solution and to suppress decomposition of the electrolytic solution or formation of a film with low lithium ion permeability of, for example, LiF. For that reason, it may be considered that positive electrode active material according to the embodiment contributes to attainment of both a high capacity due to realization of a high charge voltage and an enhancement of the charge and discharge cycle characteristic.

The non-aqueous electrolyte secondary battery according to Embodiments 1 and 2 has characteristics of light weight, high capacity and high energy density and can be widely utilized for potable small-sized electronic appliances, for example, video cameras, laptop personal computers, word processors, radio cassette recorders, mobile phones and the like.

EXAMPLE 1

A preparation method of a positive electrode active material is hereunder described. First of all, after preparing a 1 wt % 4-chlorophenol solution of polyethylene sulfide represented by Compound 1-1, lithium cobaltate having an average composition of $LiCo_{0.98}Al_{0.01}Mg_{0.01}O_2$ and having an average particle size, as measured by a laser scattering process, of 13 µm was dipped in the solution and stirred for several seconds. After stirring, the resultant was dried in a reduced-pressure environment at 60° C., thereby obtaining a positive electrode active material having polyethylene sulfide coated on lithium cobaltate.

By using the thus obtained positive electrode active material, the non-aqueous electrolyte secondary battery shown in FIGS. 4 and 5 was prepared as described below. First of all, 98% by weight of the positive electrode active material, 0.8% by weight of an amorphous carbon powder (ketjen black) as a conductive agent and 1.2% by weight of polyvinylidene fluoride (PVdF) as a binder were mixed to prepare a positive electrode mixture. This positive electrode mixture was dispersed in N-methyl-2-pyrrolidone (NMP) to prepare a positive electrode mixture slurry, which was then uniformly coated on the both surfaces of the positive electrode collector 33A made of a strip-shaped aluminum foil having a thickness of 20 µm. The obtained coated material was dried by warm air and compression molded by a roll press, thereby forming the positive electrode active material layer 33B. Thereafter, the positive electrode lead 31 made of aluminum was installed in one end of the positive electrode collector 33A.

The negative electrode 34 was prepared in the following manner. First of all, the negative electrode collector 34A (thickness: 10 μm) made of an electrolytic copper foil was prepared, and silicon as a negative electrode active material was then deposited in a thickness of 5 μm on the both surfaces of the negative electrode collector 34A by an electron beam vapor deposition process, thereby forming plural negative electrode active material particles. There was thus formed the negative electrode active material layer 34B. On that occasion, the charge capacity by the negative electrode active material was regulated at a level larger than the charge capacity of the positive electrode such that a lithium metal was not deposited on the negative electrode on the way of charge. Thereafter, the negative electrode lead 32 made of nickel was installed in one end of the negative electrode collector 34A.

Subsequently, ethylene carbonate (EC) and diethyl carbonate (DEC) were mixed as a solvent, into which was then dissolved lithium hexafluorophosphate ($LiPF_6$) as an electrolyte salt, thereby preparing an electrolytic solution. On that occasion, a composition of the solvent (EC/DEC) was regulated at 30/70 in terms of a weight ratio, and a concentration of lithium hexafluorophosphate in the electrolytic solution was regulated at 1 mole/kg.

Finally, a secondary battery was assembled by using the electrolytic solution together with the positive electrode 33 and the negative electrode 34. First of all, the positive electrode lead 31 made of aluminum was welded to one end of the positive electrode collector 33A, and the negative electrode lead 32 made of nickel was also welded to one end of the negative electrode collector 34A. Subsequently, the positive electrode 33, the separator 35 made of a microporous polypropylene film (thickness: 25 μm) and the negative electrode 34 were laminated in this order, the laminate was wound in a longitudinal direction, and an end portion of winding was then fixed by the protective tape 37 made of an adhesive tape, thereby forming a wound body which is a precursor of the wound electrode body 30. Subsequently, the wound body was interposed within the exterior member 40 made of a three-layered laminated film having a nylon film (thickness: 30 μm), an aluminum foil (thickness: 40 μm) and a non-stretched polypropylene film (thickness: 30 μm) laminated therein (total thickness: 100 μm) from the outside, and thereafter, the outer edges exclusive of one side were heat fused to each other and then housed in the inside of the exterior member 40 in a bag form. Subsequently, an electrolytic solution was injected from an opening of the exterior member 40 and impregnated in the separator 35, thereby preparing the wound electrode body 30. Finally, the opening of the exterior member 40 was sealed by means of heat fusion in a vacuum atmosphere, thereby completing a secondary battery of a laminated film type.

In examining the cycle characteristic, charge and discharge with two cycles were carried out in an atmosphere at 23° C., thereby measuring the discharge capacity; subsequently, charge and discharge were carried out in the same atmosphere until the total sum of cycle number reached 100 cycles, thereby measuring the discharge capacity; and thereafter, a discharge capacity retention rate (%)={(discharge capacity at the 100th cycle)/(discharge capacity at the 2nd cycle)}×100 was calculated. On that occasion, with respect to the charge and discharge condition with one cycle, charge was carried out at a constant current density of 1 mA/cm² until the battery voltage reached 4.2 V; charge was further carried out at a constant voltage of 4.2 V until the current density reached 0.02 mA/cm²; and thereafter, discharge was carried out at a constant current density of 1 mA/cm² until the battery voltage reached 2.5 V.

EXAMPLE 2

The battery characteristics were evaluated in the same manner as in Example 1, except that in the evaluation of battery characteristics, the charge voltage was changed to 4.35 V.

EXAMPLE 3

The battery characteristics were evaluated in the same manner as in Example 1, except that in the evaluation of battery characteristics, the charge voltage was changed to 4.40 V.

EXAMPLE 4

The battery characteristics were evaluated in the same manner as in Example 1, except that in the evaluation of battery characteristics, the charge voltage was changed to 4.50 V.

EXAMPLE 5

A non-aqueous electrolyte secondary battery was prepared and evaluated for the battery characteristics in the same manner as in Example 1, except that in the manufacture of a positive electrode active material, Compound 1-2 was used in the film layer.

EXAMPLE 6

A non-aqueous electrolyte secondary battery was prepared and evaluated for the battery characteristics in the same manner as in Example 1, except that in the manufacture of a positive electrode active material, Compound 1-3 was used in the film layer.

EXAMPLE 7

A non-aqueous electrolyte secondary battery was prepared and evaluated for the battery characteristics in the same manner as in Example 1, except that in the manufacture of a positive electrode active material, Compound 1-4 was used in the film layer.

EXAMPLE 8

A non-aqueous electrolyte secondary battery was prepared and evaluated for the battery characteristics in the same manner as in Example 1, except that in the manufacture of a positive electrode active material, Compound 1-5 was used in the film layer.

EXAMPLE 9

First of all, lithium carbonate ($Li_2CO_3$), manganese carbonate ($MnCO_3$) and ammonium phosphate (($NH_4$)$H_2PO_4$) were weighed in a molar ratio of lithium (Li) to manganese (Mn) to phosphorus (P) of 3/3/2 and mixed. The obtained mixed powder was weighed in a proportion of 2 parts by weight based on 100 parts by weight of lithium cobaltate having an average composition of $LiCo_{0.98}Al_{0.01}Mg_{0.01}O_2$ and having an average particle size, as measured by a laser scattering process, of 13 μm. Subsequently, this mixed powder and lithium cobaltate were treated for one hour using a mechanochemical unit, thereby cladding $Li_2CO_3$, $MnCO_3$ and $(NH_4)H_2PO_4$ onto the surface of lithium cobaltate. There was thus prepared a baking precursor. This baking precursor was subjected to temperature rise at a rate of 3° C. per minute, held at 900° C. for 3 hours and then gradually cooled. There was thus obtained a powder having been subjected to a coating treatment with manganese (Mn) and phosphorus (P) on the surface of lithium cobaltate.

The obtained powder was observed by a scanning electron microscope (SEM) provided with an energy dispersive X-ray (EDX) unit (this scanning electron microscope will be hereinafter referred to as "SEM/EDX"). As a result, it was confirmed that manganese (Mn) was distributed over the entire surface of the lithium cobaltate particle and that phosphorus (P) was locally interspersed on the surface of the lithium cobaltate particle.

Also, this powder was measured for a powder X-ray diffraction (XRD) pattern using CuKα having a long wavelength. As a result, in addition to a diffraction peak corresponding to $LiCoO_2$ having a layered rock salt structure, a diffraction peak assigned to $Li_3PO_4$ was confirmed.

Furthermore, an element ratio on the particle surface was measured by a scanning X-ray photoelectron spectroscope (ESCA: Quantera SXM, manufactured by Ulvac-Phi, Inc.). As a result, Co/(Co+Mn+P) was found to be 0.40.

A non-aqueous electrolyte secondary battery was prepared and evaluated for the battery characteristics in the same manner as in Example 1, except for using the lithium cobaltate particle which had been thus subjected to a coating treatment.

EXAMPLE 10

First of all, lithium carbonate ($Li_2CO_3$), nickel hydroxide ($Ni(OH)_2$) and manganese carbonate ($MnCO_3$) were weighed in a molar ratio of $Li_2CO_3$ to $Ni(OH)_2$ to $MnCO_3$ of 1.08/1/1 (corresponding to $Li_{1.08}Ni_{0.5}Mn_{0.5}O_2$), pulverized in a wet process using a ball mill unit until the average particle size reached not more than 1 μm and then dried in vacuo at 70° C. The obtained mixed powder was weighed in a proportion of 5 parts by weight based on 100 parts by weight of lithium cobaltate having an average composition of $LiCo_{0.98}Al_{0.01}Mg_{0.01}O_2$ and having an average particle size, as measured by a laser scattering process, of 13 μm. Subsequently, this mixed powder and lithium cobaltate were treated for one hour using a mechanochemical unit, thereby cladding $Li_2CO_3$, $Ni(OH)_2$ and $MnCO_3$ onto the surface of lithium cobaltate. There was thus prepared a baking precursor. This baking precursor was subjected to temperature rise at a rate of 3° C. per minute, held at 800° C. for 3 hours and then gradually cooled. There was thus obtained a powder having been subjected to a coating treatment with manganese (Mn) and nickel (Ni) on the surface of lithium cobaltate.

The obtained powder was analyzed by atomic absorption analysis. As a result, a composition of $LiCo_{0.94}Ni_{0.02}Mn_{0.02}Al_{0.01}Mg_{0.01}O_2$ was confirmed. Also, as a result of measuring the particle size by a laser diffraction process, the average particle size was found to be 13.5 μm.

Also, the powder was analyzed by SEM/EDX. As a result, the state where a nickel manganese metal compound having a particle size of from about 0.1 to 5 μm was cladded onto the surface of lithium cobaltate, and nickel (Ni) and manganese (Mn) substantially uniformly existed on the entire surface was confirmed.

A non-aqueous electrolyte secondary battery was prepared and evaluated for the battery characteristics in the same manner as in Example 1, except for using the lithium cobaltate particle which had been thus subjected to a coating treatment.

COMPARATIVE EXAMPLE 1

A non-aqueous electrolyte secondary battery was prepared and evaluated for the battery characteristics in the same manner as in Example 1, except that lithium cobaltate which had not been subjected to a coating treatment with the compound was used as the positive electrode active material.

COMPARATIVE EXAMPLE 2

The battery characteristics were evaluated in the same manner as in Comparative Example 1, except that in the evaluation of battery characteristics, the charge voltage was changed to 4.35 V.

COMPARATIVE EXAMPLE 3

The battery characteristics were evaluated in the same manner as in Comparative Example 1, except that in the evaluation of battery characteristics, the charge voltage was changed to 4.40 V.

COMPARATIVE EXAMPLE 4

The battery characteristics were evaluated in the same manner as in Comparative Example 1, except that in the evaluation of battery characteristics, the charge voltage was changed to 4.50 V.

COMPARATIVE EXAMPLE 5

A non-aqueous electrolyte secondary battery was prepared and evaluated for the battery characteristics in the same manner as in Example 9, except that lithium cobaltate which had not been subjected to a coating treatment with the compound was used as the positive electrode active material.

COMPARATIVE EXAMPLE 6

A non-aqueous electrolyte secondary battery was prepared and evaluated for the battery characteristics in the same manner as in Example 10, except that lithium cobaltate which had not been subjected to a coating treatment with the compound was used as the positive electrode active material.

COMPARATIVE EXAMPLE 7

A secondary battery was prepared and evaluated for the battery characteristics in the same manner as in Example 1, except that an electrolytic solution prepared by adding ethylene sulfite in a weight ratio of 5 to the electrolytic solution of Examples 1 to 10 and Comparative Examples 1 to 6 was used.

The results of the evaluation of battery characteristics of Examples 1 to 10 and Comparative Examples 1 to 7 are shown in the following Table 1.

|  | Active material-coated layer | Charge voltage | Compound used in film layer | Peak of $C_2H_5S^+$, $C_3H_7S^+$ or $C_4H_9S^+$ | Discharge capacity retention rate (%) |
|---|---|---|---|---|---|
| Example 1 | No | 4.20 V | Compound 1-1 | Yes | 78 |
| Example 2 | No | 4.35 V | Compound 1-1 | Yes | 67 |
| Example 3 | No | 4.40 V | Compound 1-1 | Yes | 64 |
| Example 4 | No | 4.50 V | Compound 1-1 | Yes | 53 |
| Example 5 | No | 4.20 V | Compound 1-2 | Yes | 74 |
| Example 6 | No | 4.20 V | Compound 1-3 | Yes | 71 |
| Example 7 | No | 4.20 V | Compound 1-4 | Yes | 68 |
| Example 8 | No | 4.20 V | Compound 1-5 | Yes | 70 |
| Example 9 | Yes (Mn and P) | 4.20 V | Compound 1-1 | Yes | 81 |
| Example 10 | Yes (Mn and Ni) | 4.20 V | Compound 1-1 | Yes | 83 |
| Comparative Example 1 | No | 4.20 V | No | No | 60 |
| Comparative Example 2 | No | 4.35 V | No | No | 54 |
| Comparative Example 3 | No | 4.40 V | No | No | 52 |
| Comparative Example 4 | No | 4.50 V | No | No | 47 |
| Comparative Example 5 | Yes (Mn and P) | 4.20 V | No | No | 62 |
| Comparative Example 6 | Yes (Mn and Ni) | 4.20 V | No | No | 65 |
| Comparative Example 7 | No | 4.20 V | ES added | No | 59 |

As is clear from Table 1, by forming a film which is characterized in that a peak of $C_2H_5S^+$, $C_3H_7S^+$ or $C_4H_9S^+$ obtained by cation analysis by time of flight secondary ion mass spectrometry exists on the particle surface, a lowering of the capacity retention rate could be suppressed. Also, though the capacity retention rate is lowered with an increase of the charge voltage, it was noted that by forming a film which is characterized in that a peak of $C_2H_5S^+$, $C_3H_7S^+$ or $C_4H_9S^+$ obtained by cation analysis by time of flight secondary ion mass spectrometry exists on the particle surface, a lowering of the capacity retention rate can be suppressed.

It has been noted from the foregoing results that by forming a film which is characterized in that a peak of $C_2H_5S^+$, $C_3H_7S^+$ or $C_4H_9S^+$ obtained by cation analysis by time of flight secondary ion mass spectrometry exists, which is represented by the foregoing formula (1), for example, polyethylene sulfide, polypropylene sulfide, etc., on a particle including a positive electrode material capable of intercalating and deintercalating an electrode reactant, a high capacity retention rate is obtained.

While the present application has been described with reference to the embodiments and working examples, it should not be construed that the present application is limited to the foregoing embodiments and working examples, but various modifications can be made. For example, while the secondary battery having a wound structure has been described in the foregoing embodiments and working examples, the present application is also similarly applicable to a secondary battery having a structure in which a positive electrode and a negative electrode are folded or piled up. In addition, the present application is also applicable to a secondary battery of a so-called coin type, button type or rectangular type or the like.

Also, while the secondary battery using a non-aqueous electrolytic solution or an electrolyte in a gel form as an electrolyte has been described in the foregoing embodiments, the present application is also similarly applicable to a secondary battery using a solid electrolyte. All of an inorganic solid electrolyte and a polymer solid electrolyte can be used as the solid electrolyte so far as they have ionic conductivity. Examples of the inorganic solid electrolyte utilizing an ionic conductive inorganic material include lithium nitride, lithium iodide, an ionic conductive ceramic, an ionic conductive crystal and an ionic conductive glass. The polymer solid electrolyte utilizing an ionic conductive polymer is composed of an electrolyte salt and a polymer compound capable of dissolving it therein. Examples of the polymer compound include ether based polymers such as poly(ethylene oxide) and crosslinked materials thereof, poly(methacrylate) ester based polymers and acrylate based polymers; and specific examples thereof include polyethers, polyesters, polyphosphazenes and polysiloxanes. These compounds can be used singly or upon copolymerization in a molecule or mixing.

Furthermore, while the so-called lithium ion secondary battery in which the capacity of a negative electrode is expressed by a capacity component due to intercalation and deintercalation of lithium has been described in the foregoing embodiments and working examples, the present application is also similarly applicable to a so-called lithium metal secondary battery in which the capacity of a negative electrode is expressed by a capacity component due to deposition and dissolution of lithium or a secondary battery in which by making the charge capacity of a negative electrode material capable of intercalating and deintercalating lithium smaller than the charge capacity of a positive electrode, the capacity of a negative electrode is expressed by the sum including a capacity component due to intercalation and deintercalation of lithium and a capacity component due to deposition and dissolution of lithium.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A positive electrode active material comprising:
   a particle containing a positive electrode material capable of intercalating and deintercalating an electrode reactant; and
   a film provided in at least a part of the particle and having a peak of $C_2H_5S^+$, $C_3H_7S^+$ or $C_4H_9S^+$ obtained by cation analysis by time of flight secondary ion mass spectrometry, wherein the film is formed by using at least one polymer selected from the group consisting of, polypropylene sulfide, poly(trimethylene sulfide), poly(isobutylene sulfide), and poly(tetrahydrothiophene) wherein the particle contains at least lithium and one or more transition metal elements.

2. The positive electrode active material according to claim 1, wherein
the particle contains cobalt (Co) as a principal transition metal element and has a layered structure.

3. The positive electrode active material according to claim 2, wherein
one or more elements different from the principal transition metal element constituting the particle exist in at least a part of the surface of the particle.

4. The positive electrode active material according to claim 3, wherein
at least one of nickel (Ni), manganese (Mn) and phosphorus (P) is contained as the element different from the principal transition metal element constituting the particle.

5. The positive electrode active material according to claim 3, wherein
manganese (Mn) and any one of nickel (Ni) and phosphorus (P) is contained as the elements different from the principal transition metal element constituting the particle.

6. The positive electrode active material according to claim 1, wherein an average particle size of the positive electrode active material is 2.0 μm or more and not more than 50 μm.

7. The positive electrode active material according to claim 1, wherein the film is formed by adding the at least one polymer to a solution containing the particle, and wherein an amount of the at least one polymer added to the solution is more than 0.1% by weight and less than 5% by weight relative to the particle.

8. The positive electrode active material according to claim 1, wherein the at least one polymer selected from the group consisting of, polypropylene sulfide, poly(trimethylene sulfide), poly(isobutylene sulfide), and poly(tetrahydrothiophene) is cladded on a surface of the particle.

9. The positive electrode active material according to claim 1, wherein the film is formed by adding the at least one polymer to a solution containing the particle, and wherein an amount of the at least one polymer added to the solution is 0.2% by weight or more and not more than 3.0% by weight relative to the particle.

10. A positive electrode comprising:
a conductive substrate; and
a positive electrode active material layer provided on the conductive substrate and containing at least a positive electrode active material, wherein
the positive electrode active material includes
a particle containing a positive electrode material capable of intercalating and deintercalating an electrode reactant; and
a film provided in at least a part of the particle and having a peak of $C_2H_5S^+$, $C_3H_7S^+$ or $C_4H_9S^+$ obtained by cation analysis by time of flight secondary ion mass spectrometry, wherein the film is formed by using at least one polymer selected from the group consisting of, polypropylene sulfide, poly(trimethylene sulfide), poly(isobutylene sulfide), and poly(tetrahydrothiophene) wherein the particle contains at least lithium and one or more transition metal elements.

11. A non-aqueous electrolyte secondary battery comprising:
a positive electrode having a positive electrode active material;
a negative electrode;
a separator; and
an electrolyte, wherein
the positive electrode active material includes
a particle containing a positive electrode material capable of intercalating and deintercalating an electrode reactant; and
a film provided in at least a part of the particle and having a peak of $C_2H_5S^+$, $C_3H_7S^+$ or $C_4H_9S^+$ obtained by cation analysis by time of flight secondary ion mass spectrometry, wherein the film is formed by using at least one polymer selected from the group consisting of, polypropylene sulfide, poly(trimethylene sulfide), poly(isobutylene sulfide), and poly(tetrahydrothiophene) wherein the particle contains at least lithium and one or more transition metal elements.

12. The non-aqueous electrolyte secondary battery according to claim 11, wherein
an upper limit discharge voltage is 4.20 V or more and not more than 4.80 V, and a lower limit discharge voltage is 2.00 V or more and not more than 3.30 V.

13. The non-aqueous electrolyte secondary battery according to claim 11, wherein the at least one polymer selected from the group consisting of, polypropylene sulfide, poly(trimethylene sulfide), poly(isobutylene sulfide), and poly(tetrahydrothiophene) is cladded on a surface of the particle.

* * * * *